(12) United States Patent
Fredriksson

(10) Patent No.: US 7,844,679 B2
(45) Date of Patent: Nov. 30, 2010

(54) COMPANY NETWORK USING TIME SLOT REUSE

(76) Inventor: Lars-Berno Fredriksson, Berggrand 1, Kinna (SE) S-511 00

( * ) Notice: Subject to any disclaimer, the term of this patent is extended or adjusted under 35 U.S.C. 154(b) by 872 days.

(21) Appl. No.: 10/450,245

(22) PCT Filed: Nov. 29, 2001

(86) PCT No.: PCT/SE01/02634

§ 371 (c)(1), (2), (4) Date: Nov. 5, 2003

(87) PCT Pub. No.: WO02/49383

PCT Pub. Date: Jun. 20, 2002

(65) Prior Publication Data

US 2004/0076135 A1   Apr. 22, 2004

(30) Foreign Application Priority Data

Dec. 12, 2000  (SE) .................................. 0004617

(51) Int. Cl.
G06F 15/16 (2006.01)
H04B 7/00 (2006.01)

(52) U.S. Cl. ..................... 709/208; 455/41.2

(58) Field of Classification Search ......... 709/208–211, 709/224, 248, 226, 227, 230, 237, 249; 455/452–455, 455/404.2, 436–444, 41.2
See application file for complete search history.

(56) References Cited

U.S. PATENT DOCUMENTS

| 5,185,739 A |   | 2/1993  | Spear |
|-------------|---|---------|-------|
| 5,327,577 A | * | 7/1994  | Uddenfeldt ................. 455/442 |
| 5,381,443 A | * | 1/1995  | Borth et al. ................ 375/134 |
| 5,388,102 A | * | 2/1995  | Griffith et al. ............... 370/512 |
| 5,727,034 A | * | 3/1998  | Ojaniemi .................... 375/356 |
| 5,991,628 A | * | 11/1999 | Pedziwiatr et al. .......... 455/443 |
| 6,064,887 A | * | 5/2000  | Kallioniemi et al. ........ 455/445 |
| 6,091,951 A | * | 7/2000  | Sturniolo et al. ......... 455/432.2 |
| 6,150,980 A | * | 11/2000 | Krasner ................... 342/357.1 |
| 6,394,341 B1 | * | 5/2002  | Makipaa et al. ............ 235/379 |
| 6,466,558 B1 | * | 10/2002 | Ling ........................ 370/334 |

(Continued)

OTHER PUBLICATIONS

Marko I. Silventoinen et al., Radio Resourse Management in a Novel Indoor GSM Base Station System, 1997 IEEE, pp. 776.

(Continued)

Primary Examiner—Joseph Thomas
Assistant Examiner—Brendan Higa
(74) Attorney, Agent, or Firm—Fitch, Even, Tabin & Flannery

(57) ABSTRACT

An arrangement and a device comprises a mobile data and communication network within a predetermined geographical area. The device operates with first and second functions that can consist of, for example, company and/or customers functions and communication and/or slave functions respectively. Two or more units in the first function are synchronized with each other as regards time and frequency in order to act, from the point of view of connection and disconnection functions, as a common first unit for second units that carry out the second function. Time consuming handshaking procedures are then avoided for the second units when these one's are moving and shifting between part areas of said predetermined area and the total system will operate rapidly in this respect.

22 Claims, 3 Drawing Sheets

U.S. PATENT DOCUMENTS

| | | | |
|---|---|---|---|
| 6,487,191 B1 * | 11/2002 | Kang et al. | 370/342 |
| 6,603,978 B1 * | 8/2003 | Carlsson et al. | 455/502 |
| 6,611,755 B1 * | 8/2003 | Coffee et al. | 701/213 |
| 6,658,258 B1 * | 12/2003 | Chen et al. | 455/456.1 |
| 6,675,015 B1 * | 1/2004 | Martini et al. | 455/436 |
| 6,788,656 B1 * | 9/2004 | Smolentzov et al. | 370/328 |
| 6,834,192 B1 * | 12/2004 | Watanabe et al. | 455/444 |
| 6,961,573 B1 * | 11/2005 | Moon et al. | 455/445 |
| 6,975,613 B1 * | 12/2005 | Johansson | 370/338 |
| 6,980,524 B1 * | 12/2005 | Lu et al. | 370/254 |
| 7,072,311 B1 * | 7/2006 | Czaja et al. | 370/318 |
| 7,099,625 B1 * | 8/2006 | Yoshida | 455/62 |
| 7,171,694 B1 * | 1/2007 | Jespersen et al. | 726/27 |
| 7,190,944 B2 * | 3/2007 | Kim et al. | 455/346 |
| 2002/0141360 A1 * | 10/2002 | Baba et al. | 370/331 |
| 2003/0035464 A1 * | 2/2003 | Dehner et al. | 375/132 |
| 2004/0053615 A1 * | 3/2004 | Kim et al. | 455/436 |
| 2004/0147267 A1 * | 7/2004 | Hill et al. | 455/456.1 |

OTHER PUBLICATIONS

David J. Y. Lee et al., "Integrating Bluetooth With Wireless and Ricocheting", 2000, IEEE, pp. 1310.

International Search Report of the Swedish Patent Office dated May 15, 2002 for International Application No. PCT/SE01/02634 (5 pages).

International Preliminary Examination Report of the Swedish Patent Office dated Mar. 5, 2003 for International Application No. PCT/SE01/02634 (6 pages).

* cited by examiner

COMPANY NETWORK USING TIME SLOT REUSE

CROSS-REFERENCE TO RELATED APPLICATIONS

This application is a U.S. national phase application filed under 35 U.S.C. §371 of International Application PCT/SE01/02634, filed on Nov. 29, 2001, designating the United States, which claims priority from Swedish Application 0004617-7, filed Dec. 12, 2000, which are hereby incorporated herein by reference in their entirety.

BACKGROUND

The present invention relates among other things to a communication system where the transmission of signals between different nodes takes place via company nodes (master nodes) that allocates permission to transmit to the respective mobile customer (slave) nodes in given time slots. The invention also relates to a device in the form of a mobile data and telecommunications network within a predetermined geographical area, for example within a company, factory, hospital, etc, and working with first functions, for example in the form of company (master) functions and second functions, for example in the form of communication functions and/or customers (slave) functions, established by means of fixed and/or movable nodes and/or mobile units. In addition, the invention relates to an arrangement with a mobile telecommunications and/or data network located in a geographical area, which network comprises company (master) functions and mobile customer (slave) functions.

A well-established way of carrying out wireless communication is to set-up a cell with a base station that has a number of transmitting and receiving stations within its area. These communicate with each other via the base station, that is the transmitting station has an "up" link to the base station and the receiving station has a "down" link. A well-known system with this construction is Bluetooth. The invention is described using Bluetooth as an example, but can also be implemented in all similar systems.

Bluetooth allows a master to provide service to up to seven slaves that are active. An unlimited number of slaves can be put in Park Mode and can either be activated by the master or activate themselves. A master can have a very restricted range. It is usually a question of a restriction to approximately 10 m, but technically a considerably larger range can be achieved. Bluetooth provides standardized profiles that can be used in the present invention, for example, K1-6 and K9 are relevant.

It is desirable to be able to use Bluetooth standard units as headsets, PCs, mobile telephones, etc, in order to provide service from various sources, for example companies, within their geographical area, for example, within a department store, a petrol station, etc. A problem is that there are many customers in the area, and that each node in the company's network can only handle at most seven customers at a time. This means that it is necessary to have many masters within the area, and as these utilize the frequency range independent of each other, there is an inefficient utilization of the local bandwidth. In addition, the customers, that is the Bluetooth slaves, must re-synchronize or rather execute handshakings frequently to new masters. Said handshaking procedures are time consuming in Bluetooth.

Solution

The company arranges a Bluetooth network in the usual way and sets itself up as the master in the pico-network. By this means, full control is obtained of the bandwidth utilization for the slaves connected to the pico-network. By synchronizing for time and frequency all the master nodes belonging to the company within the area, these can appear to be one and the same master to all the slaves within the area.

SUMMARY

Design of the Company's System

The company's nodes differ from the Bluetooth specification in that they are synchronized to one and the same clock, that is each node in the company refers to one and the same Bluetooth time. In addition, their frequency hop is synchronized. All use the same frequency and change frequencies simultaneously, and they use the same BD_ADDRESS. In this way, the Bluetooth nodes belonging to the customers that are connected up to the company network at any time, perceive that they are interacting with one and same Bluetooth master regardless of which company node is within their range.

At each node in the company system there is a gateway to a common network for the company that can be cable-based or wireless. In the wireless version, certain time slots in the planning of the nodes' Bluetooth schedule can be reserved for communication between adjacent company nodes. Through the common company network, the nodes can exchange messages with each other and/or a central node belonging to the company with database and connection to other public networks such as the Internet, public telephone network, etc.

The company nodes are preferably permanently installed and their geographical location is arranged to suit their antenna layout or vice versa, so that a suitable range pattern and overlap pattern is obtained between them, and the time slots are scheduled so that the available bandwidth serves an optimal number of customer nodes in the system with regard to quality and availability. As the company nodes are synchronized with each other, the company network occupies a minimal part of the available bandwidth. The concept can be developed further so that the company can have several parallel networks that are coordinated with each other so that collisions between them do not occur. In this way, the maximal space is created for other Bluetooth nodes within the area.

Synchronization

The customer nodes synchronize themselves to the company network preferably at special synchronization nodes, but alternatively this can be carried out at any company node. The synchronization method does not differ from the Bluetooth standard. In conjunction with the synchronization, appropriate information is exchanged for further service provision in the system, for example, name, account number, customer profile, etc, and is updated in the central database. The central unit can be connected to a GPS node and can thereby be synchronized to GPS time, whereby the company's Bluetooth time can be synchronized to GPS time. Customer nodes that are synchronized to GPS time and that have the ability to synchronize their Bluetooth time to this, can thereby be synchronized to the company's nodes via software/data sent to them without synchronizing themselves via the synchronization node, or alternatively, after having synchronized themselves once in the conventional way, they will thereafter be permanently synchronized via the GPS time.

Operation

As all the company nodes are able to communicate with each other and with the central node, the active company nodes can be served in a suitable way. The different company nodes are scheduled so that they have particular exclusive time slots within their area of coverage. Outside the area of coverage, the same time slots can be allocated to other company nodes. In overlapping areas, a time slot that has been allocated to a company node can be listened to by the other company nodes. By measuring the signal strength (RSSI), an adjacent node can take over a customer node from an adjacent company node. There are several more or less sophisticated solutions for this. The simplest can be to take over when the signal strength exceeds a pre-programmed threshold value. Another can be that during a transitional stage, two (or more) company nodes allocate the customer node a time slot belonging to the respective company node. The information from the customer node can be used by the company node that currently requires it, as all can listen. Sniff, Hold and Park Mode can be used according to the Bluetooth specification in order to utilize the available bandwidth in the optimal way. Beacon signal, Beacon access windows, etc, can be synchronized within the whole company, and customer nodes can thereby attract attention when the customer needs to access the company system.

Scenario

The customer drives within range of a synchronization node in the company system. The customer's BT node is synchronized to the company network and the customer is asked what he is interested in. The customer replies, for example, "shoes". The company system gives a list of all the places that sell shoes within the system and what type of shoes. The customer selects one of the suggestions and the company system informs him of the nearest available parking place. The customer can be directed to this either via his own navigation system using GPS coordinates, or by the respective company nodes on the way giving appropriate directions. Once he is parked, the nearest company node sends the information about the car's parking place to the central node, which stores it in memory. The customer now leaves the car and the car's BT node provides the requisite information to the driver and passengers' BT nodes and information about which these are to the company system. The driver and passenger nodes connect to the company system. The information is saved in the central system. As the customers move around in the company system, this is updated and one company node is active while adjacent nodes monitor the communication and are ready to take over the respective node. The customer nodes can be directed to go into Park Mode by the company system when this is appropriate. The customer nodes can themselves also request to be directed into Park Mode. PM_ADDR can be used and in this way the company can wake up the nodes at regular intervals. Several customer nodes will have the same PM_ADDR, but as in most cases they will be in contact with different company nodes, they will not collide. With a PM_ADDR, the company system obtains information about where a plurality of customer nodes are to be found in the system. BD_ADDR can always be used if there is a need to wake a particular customer node. The company system can choose which company nodes are to send the command. This can be one, several or all of them. If several give the command, this preferably takes place simultaneously. With knowledge of the most recent customer position, suitably located company nodes can be used for the purpose.

Our family has now arrived at the shoe shop. This is the location of a number of company nodes. These can in turn be connected, via radio, infrared or cables, to one or more shoe-shop nodes that correspond locally to the central node. These local central nodes are connected to the company system. The local node suitably covers a geographical area such that it can serve up to six or seven customers. The customer sees a shoe he is interested in and reads its identity. (In a further development of the concept, the information can be scanned in, entered via an electronic tag, etc.) He asks the system whether it is available in size 45. The system checks whether such is the case and informs him of the result. If the shoes are available, the system asks the customer if he wants to try on a pair. If he replies in the affirmative, the system informs the nearest assistant (who is also connected to the company system) of the request and where the customer is located. The customer tries on the shoes and likes them. The customer informs the system that he wants to buy the pair. The system informs him of the price and which account is to be charged and asks the customer for a confirmation. The customer gives a confirmation and the company system implements the transaction. If the shoes have an anti-theft device, this is deactivated in an appropriate way. The customer takes the shoes and leaves.

Now the husband and wife have been separated for a short while. The husband asks the system where his wife, or more precisely where his wife's customer node, is located. The system checks via the central node where she most recently made contact. If her node is active in the system or has recently been active, then information is provided about the location. This indication can refer to a geographical reference system or be in descriptive text, for example "in the hosiery department of the ladies outfitting shop 'Damex'." The company system can offer directions to his wife, or alternatively give her a message or set up a voice link.

In a further development of the concept, all information between the customer and the company system can be carried out by voice. For the customer, it is then as though he were talking to a person who represents the company. In the company system, the voice processing can be carried out at several different levels, locally in the nearest company node, in the local central node to which the nearest company node is connected, or in the central node or in an even higher system, depending upon what is technically the most appropriate.

What the system can offer the company in question concerning customer information should be obvious and is not dealt with here.

The concept of the invention can be developed further for other areas and types of service, for example, medical care, training, factory communication, etc.

BRIEF DESCRIPTION OF THE DRAWINGS

An arrangement and a device that has the significant characteristics of the invention will be described below with reference to the attached figures in which.

DETAILED DESCRIPTION

Figure 1:
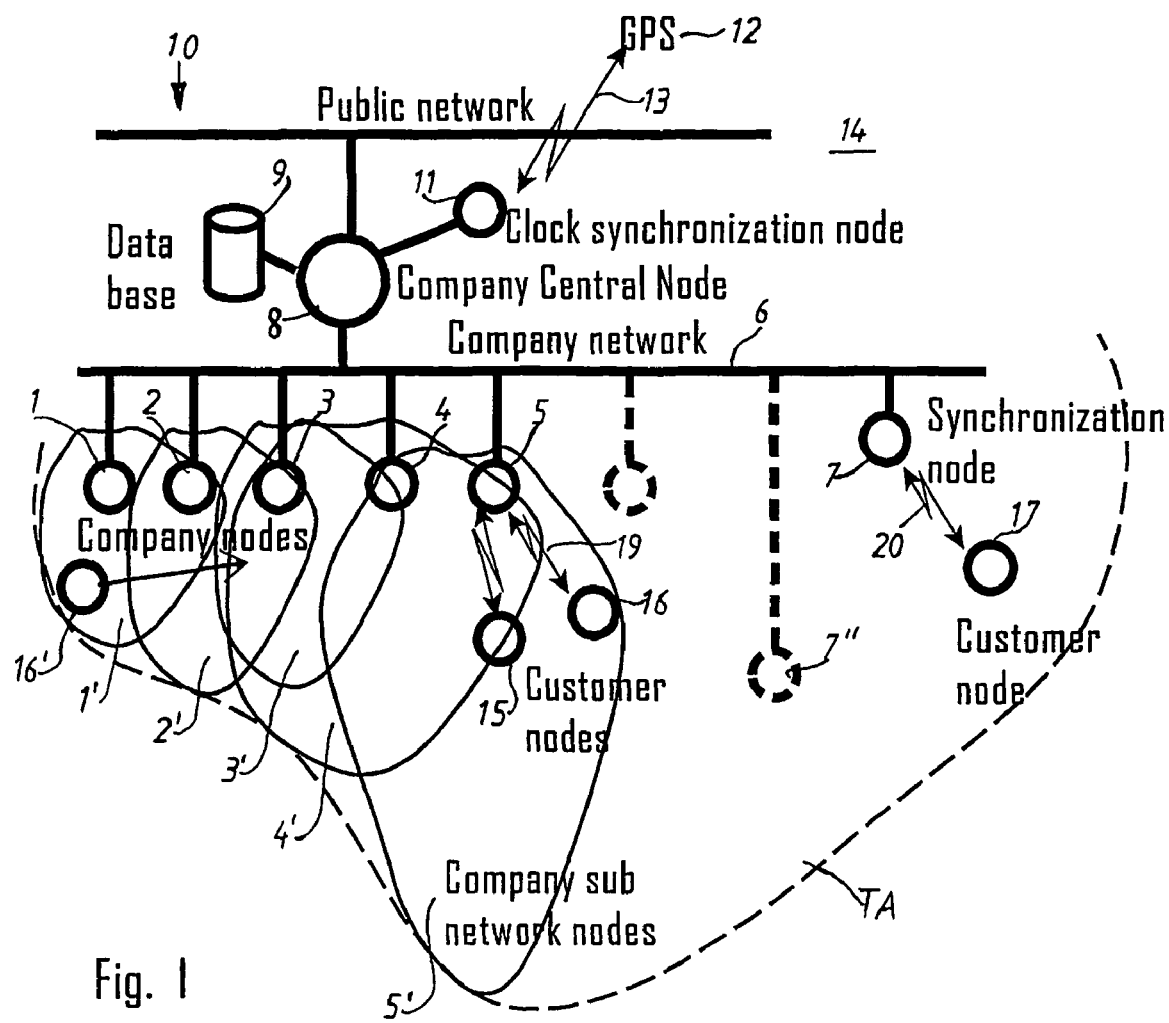
FIG. 1 shows schematically in outline form a communication system arranged within a geographical area with units that carry out base station functions or act as masters and mobile units that are to utilize the network in question.

In FIG. 1 a number of company nodes are indicated by 1, 2, 3, 4 and 5. The nodes are connected to a company network 6, to which a number of synchronization nodes 7 are also connected. The company has a central node 8 with one or more databases 9. The company network can be connected via the central node to an external network 10, which can consist of a data and/or telecommunications network, for example the public data and/or telecommunications network. A clock synchronization node is also connected to the central node. The clock synchronization node can be influenced by the so-called GPS function 12 and obtain the GPS time via a wireless link 13 in a known way. The geographical area in question, that can consist of a company, hospital, factory, etc., has been principally indicated by 14. Mobile units or customer nodes that enter the geographical system 14 have been indicated by 15, 16, 17 in FIG. 1. The entering customer nodes in question can be synchronized by means of a synchronization node, cf. the mobile unit or customer node 17 that is assumed to be synchronized as regards time with the synchronization node 7 in FIG. 1. It is also possible to implement the clock synchronization function in other company node(s). The customer nodes communicate with the company/synchronization nodes via wireless connections 18, 19, 20. The connection and disconnection functions can be controlled by buttons and/or be voice-controlled in a known way. Thus, in accordance with the above, all exchange of information between the customer and the company system can be carried out by means of voice communication, where it is for the customer as though he or she were talking to a person who represents the company. The voice processing can be carried out at several different levels in accordance with the above.

Figure 2:
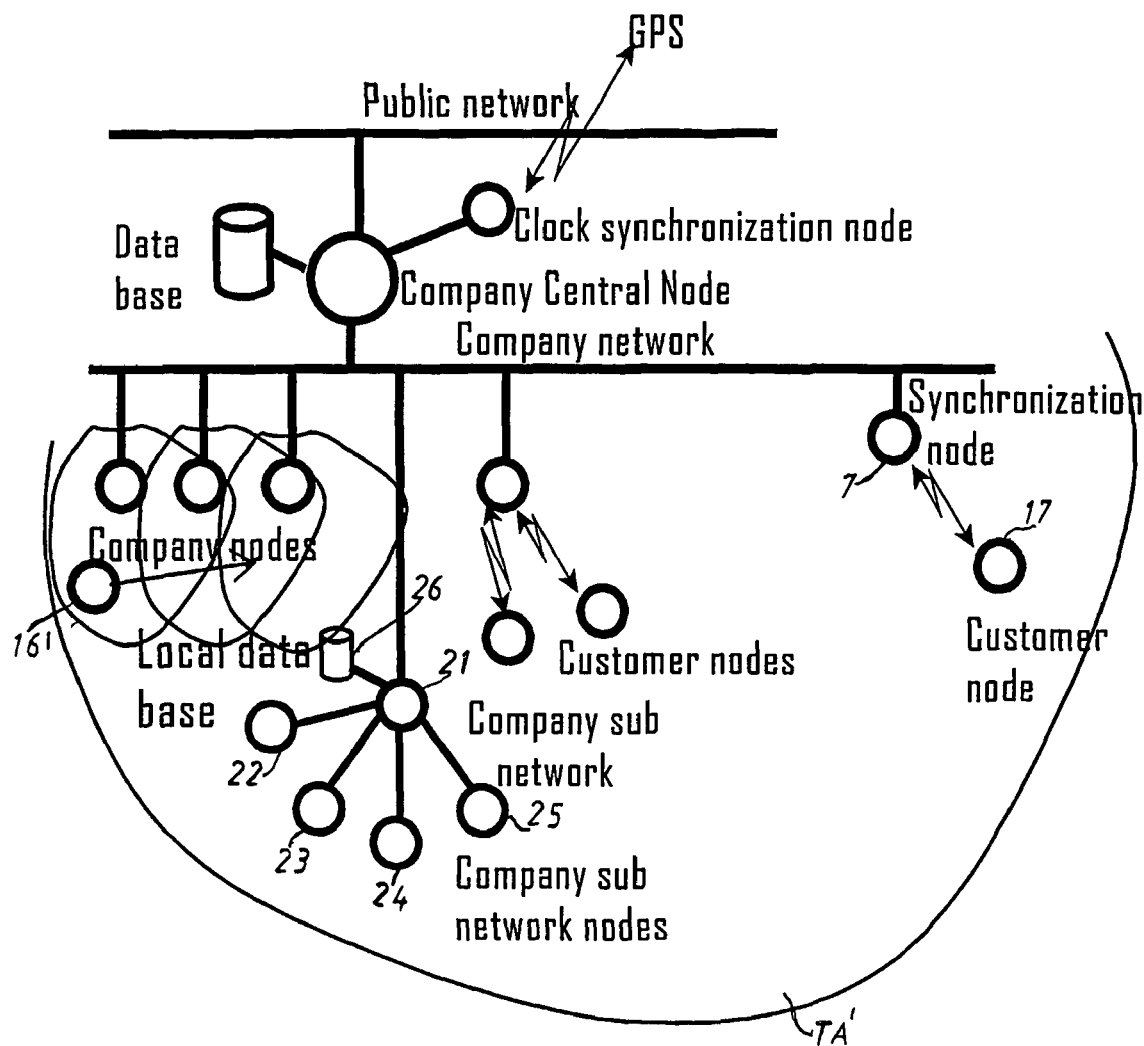
FIG. 2 shows schematically in outline form a different embodiment to the embodiment shown in FIG. 1.
Figure 3:
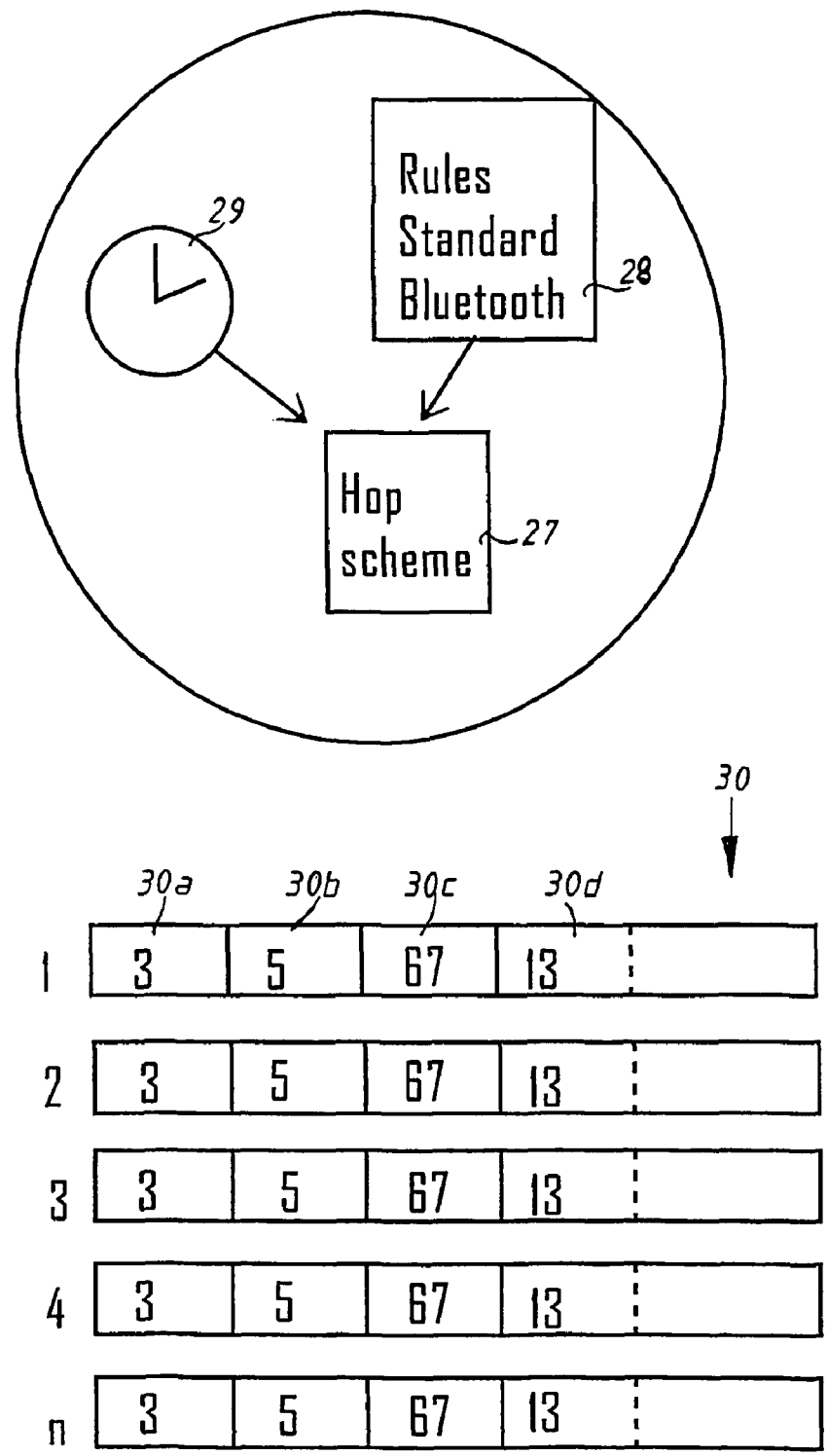
FIG. 3 shows principally and a table of the hop operation.

The embodiment shown in FIG. 2 conforms in the main with the embodiment described in connection with FIG. 1. The difference is that FIG. 2 comprises a case where a company node 21 connected to the company network 6 in turn acts as a higher-level unit in relation to a number of company subsidiary nodes 22, 23, 24, and 25. In this case, the said company node 21 has a local database 26. In this way, the system can, for example, serve a number of subsidiary geographical areas 1', 2', 3', 4' and 5' that are located within an overall geographical area 14. Pure data communication and/or telecommunication can be carried out between the units in the system, but, for example, in this embodiment of the system, monitoring and/or controlling data can alternatively or additionally be exchanged both as signals and voice commands for processes, carrying out commands, etc.

The invention is not limited to the embodiment described above by way of example, but can be subject to modifications within the scope of the following claims and concept of the invention.

The invention claimed is:

1. A wireless communication system, comprising:
    a plurality of master nodes comprising wireless communication devices;
    at least one slave node comprising at least one wireless communication device;
    the plurality of master nodes arranged to provide communication coverage for at least subsidiary geographic areas that are located within an overall geographical area wherein at least some of the subsidiary geographic areas are non-adjacent to one another, at least one of the plurality of master nodes configured to activate and deactivate the at least one slave node for communication within an associated portion of the overall geographic area;
    wherein all of the plurality of master nodes are configured to in operation operate continuously with a coordinated time slot and a common Bluetooth frequency, wherein shifting of each of the plurality of master nodes to a different Bluetooth frequency is synchronized;
    wherein the plurality of master nodes are configured to communicate with the at least one slave node using said coordinated time slot and said common Bluetooth frequency so as to appear to the at least one slave node as a common master node with respect to the at least one slave node having moved between the subsidiary geographic areas of said predetermined geographic area.

2. The system of claim 1, further comprising a time and frequency synchronizing node configured to coordinate time slot usage and frequency utilization.

3. The system of claim 2, wherein the time and frequency synchronizing node comprises a GPS receiver.

4. The system of claim 1, wherein the plurality of master nodes are operatively connected to a network.

5. The system of claim 1, further comprising a database accessible by at least one of the plurality of master nodes.

6. The system of claim 5, wherein the database is accessible by said at least one of the plurality of master nodes through the network.

7. The system of claim 1, wherein the at least one slave node is synchronized through any of the plurality of master nodes via a Bluetooth standard synchronization method.

8. The system of claim 7, wherein, responsive to synchronizing the at least one slave node, the system is configured to exchange information, the information including one or more of a name, an account number, and a customer profile that is updated in a central database.

9. The system of claim 1, the system further comprising a GPS node that synchronizes a Bluetooth system time to a GPS time.

10. The system of claim 9, wherein responsive to the at least one slave node being synchronized to GPS time, the at least one slave node is synchronized with respect to time to the plurality of master nodes with data sent from the at least one of the plurality of master nodes, wherein the at least one slave node that is synchronized to the GPS time synchronizes an associated Bluetooth time to the GPS time so as to achieve synchronization to the plurality of master nodes for data exchange therebetween.

11. The system of claim 1, further comprising overlapping coverage areas between two or more of the plurality of master nodes, wherein an adjacent master node may assume control of the at least one slave node from the particular master node in response to a received signal strength measured at the adjacent master node.

12. The system of claim 1, wherein responsive to the at least one slave node being synchronized to GPS time, the at least one slave node is synchronized with respect to time to the plurality of master nodes with data sent from the at least one of the plurality of master nodes.

13. The system of claim 1, wherein the plurality of master nodes are further configured to operate with a second coordinated time slot associated with a second common frequency, wherein the plurality of master nodes shift to a different second common frequency substantially simultaneously, and wherein the master nodes comprise a plurality of separate and parallel networks configured to communicate with the at least one slave node.

14. A system for wireless communication, the system comprising:
    first units comprising wireless communication devices;
    second units comprising wireless communication devices;
    the first units arranged to carry out base station functions within subsidiary geographical areas that are located within a predetermined geographical area wherein at least some of the subsidiary geographic areas are non-adjacent to one another;
    the second units arranged to carry out communication and data functions within the predetermined geographic area;

wherein the first units are configured to communicate with the second units using a Bluetooth compatible protocol;

wherein all of the first units are configured to in operation operate continuously with a coordinated time slot and a common Bluetooth frequency, wherein shifting of each of the plurality of master nodes to a different Bluetooth frequency is synchronized; and wherein the first units are configured to communicate with at least one of the second units using said coordinated time slot and said common Bluetooth frequency so as to appear to the at least one second unit as a common base station with respect to the at least one second unit having moved between the subsidiary geographic areas of said predetermined geographic area.

15. The system of claim 14, wherein the first and second units operating within said predetermined geographical area are synchronized to a common time reference.

16. The system of claim 15, wherein said common time reference corresponds to a Bluetooth time reference.

17. The system of claim 14, wherein said first and second units use identical address functions.

18. The system of claim 14, further comprising a common network accessible by one or more of the first units.

19. The system of claim 18, wherein the common network comprises a wireless Bluetooth network, wherein Bluetooth time slot schedules for each of the first and second units are allocated such that selected time slots are reserved for communication between adjacent first units.

20. The system of claim 14, wherein responsive to the second units being synchronized to GPS time, the second units are synchronized to the first units with respect to time in response to data sent from the first units.

21. A communications system within a predetermined total geographic area, the system comprising:

first units comprising wireless communication devices;

second units comprising wireless communication devices;

the first units each comprising a base station having base station capacity therein that covers a portion of the total geographic area, wherein different overlapping portions of the total geographic area are covered by associated first units and at least some of the portions are non-adjacent to one another;

said first units being configured to be in operation operatively connected to an external network;

said first units being configured to be in operation synchronized with each other to operate continuously with a coordinated time slot and a common Bluetooth frequency, wherein shifting of each of the plurality of first nodes to a different Bluetooth frequency is synchronized;

wherein the second units comprise slave units which are configured to in operation be positioned in or enter into the different overlapping portions of the total geographic area; and wherein the first units are configured to communicate with at least one of the second units using said coordinated time slot and said common Bluetooth frequency so as to appear to the at least one of the second units as a common master node with respect to the at least one of the second units having moved between portions of the total geographic area.

22. A system for wireless communication, the system comprising:

first units comprising a wireless communication devices;

the first units configured to carry out base station functions within overlapping geographical areas located within a predetermined geographical area wherein at least some of the overlapping geographical areas are non-adjacent to one another; and wherein the first units are configured to:

communicate using a Bluetooth compatible protocol with at least one second unit comprising a wireless communication device within the predetermined geographical area;

operate continuously with a coordinated time slot and a common Bluetooth frequency, wherein shifting of each of the first nodes to a different Bluetooth frequency is synchronized; and communicate with at least one of the second units using said coordinated time slot and said common Bluetooth frequency so as to appear to the at least one second unit as a common master node with respect to the at least one second unit having moved between overlapping geographical areas.

* * * * *

UNITED STATES PATENT AND TRADEMARK OFFICE
CERTIFICATE OF CORRECTION

| | | |
|---|---|---|
| PATENT NO. | : 7,844,679 B2 | Page 1 of 1 |
| APPLICATION NO. | : 10/450245 | |
| DATED | : November 30, 2010 | |
| INVENTOR(S) | : Fredriksson | |

It is certified that error appears in the above-identified patent and that said Letters Patent is hereby corrected as shown below:

Title page, item (76), under "Inventor", in Column 1, Lines 1-2, delete "Berggrand 1, Kinna (SE) S-511 00" and insert -- Kinnahult, SE --.

Title page, item (56), under "Other Publications", in Column 2, Line 1, delete "Resourse" and insert -- Resource --.

Column 1, line 34, delete "set-up" and insert -- set up --.

Column 4, line 50, delete "which" and insert -- which: --.

Column 6, line 20, in Claim 8, delete "wherein," and insert -- wherein --.

Column 8, lines 25-26, in Claim 22, delete "some of the overlapping" and insert -- some overlapping --.

Signed and Sealed this
Seventeenth Day of May, 2011

David J. Kappos
*Director of the United States Patent and Trademark Office*